United States Patent [19]

Wahbe et al.

[11] Patent Number: 5,761,477
[45] Date of Patent: Jun. 2, 1998

[54] METHODS FOR SAFE AND EFFICIENT IMPLEMENTATIONS OF VIRTUAL MACHINES

[75] Inventors: Robert S. Wahbe; Steven E. Lucco, both of Seattle, Wash.

[73] Assignee: Microsoft Corporation, Redmond, Wash.

[21] Appl. No.: 566,613

[22] Filed: Dec. 4, 1995

[51] Int. Cl.$^6$ ................................................ G06F 11/00
[52] U.S. Cl. .................. 395/406 A; 395/904; 395/705
[58] Field of Search .................................... 395/705, 670, 395/406, 704

[56] References Cited

U.S. PATENT DOCUMENTS

| | | | |
|---|---|---|---|
| 4,667,290 | 5/1987 | Goss et al. | 364/300 |
| 5,386,557 | 1/1995 | Boykin et al. | 365/600 |
| 5,644,709 | 7/1997 | Austin | 395/185.06 |

OTHER PUBLICATIONS

S. Lucco, O. Sharp, and R. Wahbe, "Omniware: A Universal Substrate for Web Programming", http://www.w3.org/Conferences/WWW4/Papers/165.

H. M. Deitel, An Introduction to Operating Systems, second ed., Addison–Welsley Pub. Comp., pp. 703–732, 1990.

K. Li and P. Huda, "Memory Coherence in Shared Virtual Memory Systems", Proceedings of the 5th ACM Symposium on Principles of Distributed Computing, pp. 229–239, Aug. 1986.

C.N. Fischer and R.J. Leblanc, "The Implementation of Run–time Diagnostics in PASCAL", IEEE Transactions on Software Engineering, Jul. 1980 vol. SE–6, #4, pp. 313–319.

T. Austin, S. Breach, and G. Sohi, "Efficient Detection of All Pointer and Array aAcess Errors", Proceedings of the ACM Conference on Programming Language Design and Implementation, pp. 290–301, Jun. 1994.

J. Gosling, "Java Intermediate Bytecodes", ACM SIGPLAN Workshop on Intermediate Representations, pp. 111–118, Jan. 1995.

"Telescript Technology: Scenes from the Electronic Marketplace", General Magic, Sunnyvale, CA, 1996.

R. Brooks, R. Gabriel, and G. Steele, Jr., "An Optimizing Complier for Lexically Scoped Lisp", ACM Symposium on Lisp and Functional Programming, pp. 261–275, Aug. 1982.

D. Luckham, and N. Suzuki, "Verification of Array, Record, and Pointer Operations in PASCAL", ACM Transactions on Programming Languages and Systems, Oct. 1979, vol. 1, #2, pp. 226–244.

J. Ellis, and D. Detlefs, "Safe, Efficient Garbage Collection for C++", Proceedings of the USENIX C++Conference, pp. 143–177, Apr. 1994.

E. Jul, H. Levy, N. Hutchinson, and A. Black, "Fine–Grained Mobility in the Emerald System", ACM Transactions on Computer Systems, vol. 6, #1, Feb. 1988, pp. 109–133.

(List continued on next page.)

Primary Examiner—Alvin E. Oberley
Assistant Examiner—Sue Lao
Attorney, Agent, or Firm—Duft, Graziano & Forest,PC

[57] ABSTRACT

An efficient method for implementing a safe virtual machine, in software, that embodies a general purpose memory protection model. The present invention runs on any general purpose computer architecture and will run an executable that has been developed for the virtual machine. The present invention compiles the executable into the native instructions of the hardware. During the compilation, specialized code sequences are added to the code using a technique called software fault isolation. A set of allowed behaviors and a set of responses to the undesirable actions will be created and written to memory. A series of optimizations are applied so that the translated code executes at nearly the native speed of the architecture, but the fault isolation sequences prevent it from engaging in undesirable actions. In particular, the memory protection model is enforced, providing the same level of protection that customarily requires hardware support to enforce efficiently.

12 Claims, 8 Drawing Sheets

OTHER PUBLICATIONS

P. Klint, "Interpretation Techniques", Software—Practice and Experience, Sep. 1981, vol. 11 #9, pp. 963–973.

A. Goldberg and D. Robson, "Smalltalk–80: The Language and Its Implementation", Addison–Wesley, 1983, Reading, MA.

J. Davidson and J. Gresh, "Cint: A RISC Interpreter for the C Programming Language", Proceedings of the SIGPLAN '87 Symposium on Interpreters and Interpretive Techniques, Jun. 1987, pp. 189–197.

L. Deutsch and A. Schiffman, "Efficient Implementation of the Smalltalk–80 System", Preceedings of the 11th Annual ACM Symposium on Principles of Programming Languages, pp. 297–302, Jan. 1984.

C. Chambers, D. Ungar, and E. Lee, "An Efficient Implementation of SELF, a Dynamically–typed Object–Oriented Language Based on Prototypes", LISP and Symbolic Computation, Jul. 1991, vol. 4, #3, pp. 243–281.

C. May "MIMIC: A Fast System/370 Simulator", Proceedings of the SIGPLAN '87 Symposium on Interpreters and Interpretive Techniques, pp. 1–13, Jun. 1987.

B. Cmelik and D. Keppel, "Shade: A Fast Instruction–Set Simulator for Execution Profiling"ACM SIGMETRICS Conference on Measurement and Modeling of Computer Systems, 1994, pp. 128–137, May 1994.

R. Sites, A Chernoff, M. Kirk, M. Marks, and S. Robinson, "Binary Translation", Communications of the ACM, Feb. 1993, vol. 36, #2, pp. 69–81.

"Efficient Software–Based Fault Isolation" by Wahbe, Lucco, Anderson & Graham, Proceedings of the Symposium on Operating System Principles, Dec. 1993.

"The Evolution of Virtual Machine Architecture" by Buzen & Gagliardi, National Computer Conference, 1973.

"Survey of Virtual Machine Research" by Goldberg, Honeywell Information Systems, Waltham Massachusetts, and Harvard University, Jun. 1974.

FIG. 1

PRIOR ART

| Virtual Machine Architecture | | |
|---|---|---|
| Addressing Mode Symbols | | |
| rd | -> | dest int reg |
| rs1 | -> | source int reg |
| rs2 | -> | source int reg |
| fd | -> | dest float reg |
| fs1 | -> | source float reg |
| fs2 | -> | source float reg |
| imm | -> | 16-bit signed immediate |
| imm32 | -> | 32-bit signed immediate; |
| aux32 | -> | 32-bit immediate signed integer opperand |
| shimm | -> | 5-bit unsigned immediate for shift amount |
| o | -> | 16-bit signed offset for effective address computation |
| sym26 | -> | 26-bit index of symbol in symbol table |
| sym | -> | 32-bit index of symbol in symbol table |
| pcrel30 | -> | 30 bit signed pc-relative word offset |
| pcrel26 | -> | 26-bit signed pc-relative word offset |
| c1 | -> | 5-bit constant giving start bit in bitfield |
| c2 | -> | 5-bit constant giving size of bitfield |
| double | -> | double precision constant |

Instruction Formats

| | |
|---|---|
| REG32 => | [op:6 \| rd:5 \| sub_op:5 \| rs1:5 \| rs2:5 \| shift_amt:5 \| fill:1] |
| IMM32 => | [op:6 \| rd:5 \| rs1:5 \| imm16:16] |
| EXT64 => | [op:6 \| rd:5 \| sub_op:5 \| imm16:16 \| rs1:5] |
| JUMP32 => | [op:6 \| pcrl:26] |
| IMM64 => | [op:6 \| rd:5 \| sub_op:5 \| imm16:16 \| imm32:32] |
| REG64 => | [op:6 \| rd:5 \| sub_op:5 \| rs1:5 \| rs2:5 \| fill:6 \| imm32:32] |
| BF64 => | [op:6 \| rd:5 \| sub_op:5 \| imm16:16 \| rs1:5 \| c1:5 \| c2:5 \| fill:1] |
| REG96 => | [op:6 \| rd:5 \| sub_op:5 \| rs1:5 \| rs2:5 \| fill:6 \| imm32:32 \| aux 32:32] |
| DOUBLE96 => | [op:6 \| rd:5 \| sub_op:5 \| rs1:5 \| rs2:5 \| fill:6 \| double:64] |

List of Instructions

| Name | Operands | Format | Op (octal) | Sub_op (binary) |
|---|---|---|---|---|
| add.i | rd, rs1, rs2 | REG32 | 00 | |
| add.i | rd, rs1, imm16 | IMM32 | 01 | |
| add.f | fd, fs1, fs2 | REG32 | 71 | 00000 |
| add.d | fd, fs1, fs2 | REG32 | 71 | 00001 |
| sub.i | rd, fs1, rs2 | REG32 | 06 | |
| sub.i | rd, rs1, imm16 | IMM32 | 07 | |
| subr.i | rd, imm16, rs | IMM32 | 77 | |

FIG. 4B

| | | | | |
|---|---|---|---|---|
| sub.f | fd, fs1, fs2 | REG32 | 71 | 000 10 |
| sub.d | fd, fs1, fs2 | REG32 | 71 | 000 11 |
| and | rd, rs1, rs2, | REG32 | 02 | |
| and | rd, rs1, imm16 | IMM32 | 03 | |
| ior | rd, rs1, rs2, | REG32 | 04 | |
| ior | rd, rs1, imm16 | IMM32 | 05 | |
| xor | rd, rs1, rs2, | REG32 | 66 | |
| xor | rd, rs1, imm16 | IMM32 | 67 | |
| mul.i | rd, rs1, rs2, | REG32 | 70 | 110 00 |
| mul.i | rd, rs1, imm16 | EXT64 | 70 | 110 10 |
| mul.f | fd, fs1, fs2 | REG32 | 71 | 001 00 |
| mul.d | fd, fs1, fd2 | REG32 | 71 | 001 01 |
| div.i | rd, rs1, rs2 | REG32 | 70 | |
| div.i | rd, rs1, imm16 | EXT64 | 70 | |
| div.f | fd, fs1, fs2 | REG32 | 71 | 001 10 |
| div.d | fd, fs1, fs2 | REG32 | 71 | 001 11 |
| mod.i | rd, rs1, rs2 | REG32 | 70 | 100 00 |
| mod.i | rd, rs1, imm16 | EXT64 | 70 | 100 01 |
| sr.i | rd, rs1, rs2 | REG32 | 11 | |
| sr.i | rd, rs1, shimm | REG32 | 12 | |
| sr.u | rd, rs1, rs2 | REG32 | 21 | |
| sr.u | rd, rs1, shimm | REG32 | 22 | |
| sl | rd, rs1, rs2 | REG32 | 13 | |
| sl | rd, rs1, shimm | REG32 | 20 | |
| neg | rd, rs1 | REG32 | 60 | |
| not | rd, rs1 | REG32 | 61 | |
| fneg.f | fd, fs1 | REG32 | 71 | 010 00 |
| fneg.d | fd, fs1 | REG32 | 71 | 010 01 |
| fabs.f | fd, fs1 | REG32 | 71 | 010 10 |
| fabs.d | fd, fs1 | REG32 | 71 | 010 11 |
| fsqrt.f | fd, fs1, | REG32 | 71 | 011 00 |
| fsqrt.d | fd, fs1, | REG32 | 71 | 011 01 |
| movfti.f | fd, fs1 | REG32 | 71 | 011 10 |
| movfti.d | fd, fs1 | REG32 | 71 | 011 11 |
| movitf.f | fd, rs1 | REG32 | 71 | 100 00 |
| movitf.d | fd, rs1 | REG32 | 71 | 100 01 |
| cvtd.i | rd, fs1 | REG32 | 71 | 100 10 |
| cvtd.f | fd, fs1 | REG32 | 71 | 100 11 |
| cvtf.d | fd, fs1 | REG32 | 71 | 101 00 |
| cvtf.i | rd, fs1 | REG32 | 71 | 101 01 |

FIG. 4C

| | | | | |
|---|---|---|---|---|
| cvti.f | fd, rs1 | REG32 | 71 | 101 10 |
| cvti.d | fd, rs1 | REG32 | 71 | 101 11 |
| ld.f | fd, o(rs) | EXT64 | 71 | 110 00 |
| ld.d | fd, o(rs) | EXT64 | 71 | 110 01 |
| ld.i18 | rd, o(rs) | IMM32 | 26 | |
| ld.i16 | rd, o(rs) | EXT64 | 72 | 000 00 |
| ld.iw | rd, o(rs) | IMM32 | 14 | |
| ld.u8 | rd, o(rs) | IMM32 | 36 | |
| ld.u16 | rd, o(rs) | EXT64 | 72 | 000 10 |
| st.f | fd, o(rs) | EXT64 | 70 | 011 00 |
| st.d | fd, o(rs) | EXT64 | 70 | 011 01 |
| st.i8 | rd, o(rs) | IMM32 | 27 | |
| st.i16 | rd, o(rs) | EXT64 | 72 | 000 01 |
| st.iw | rd, o(rs) | IMM32 | 15 | |
| st.u16 | rd, o(rs) | EXT64 | 72 | 000 11 |
| ld.f | fd, [rs1+rs2] | REG32 | 71 | 110 10 |
| ld.d | fd, [rs1+rs2] | REG32 | 71 | 110 11 |
| ld.i8 | rd, [rs1+rs2] | REG32 | 30 | |
| ld.i16 | rd, [rs1+rs2] | REG32 | 72 | 001 00 |
| ld.iw | rd, [rs1+rs2] | REG32 | 15 | |
| ld.u8 | rd, [rs1+rs2] | REG32 | 37 | |
| ld.u16 | rd, [rs1+rs2] | REG32 | 72 | 000 10 |
| st.f | fd, [rs1+rs2] | REG32 | 70 | 011 10 |
| st.d | fd, [rs1+rs2] | REG32 | 70 | 011 11 |
| st.i8 | rd, [rs1+rs2] | REG32 | 35 | |
| st.i16 | rd, [rs1+rs2] | REG32 | 72 | 001 01 |
| st.iw | rd, [rs1+rs2] | REG32 | 17 | |
| st.u16 | rd, [rs1+rs2] | REG32 | 72 | 001 11 |
| ld.f | fd,sym+o | IMM64 | 70 | 001 00 |
| ld.d | fd,sym+o | IMM64 | 70 | 001 01 |
| ld.i8 | rd,sym+o | IMM64 | 64 | |
| ld.i16 | rd,sym+o | IMM64 | 72 | 010 00 |
| ld.u8 | rd,sym+o | IMM64 | 55 | |
| ld.u16 | rd,sym+o | IMM64 | 72 | 010 10 |
| ld.iw | rd,sym+o | IMM64 | 24 | |
| st.f | fd,sym+o | IMM64 | 70 | 010 00 |
| st.d | fd,sym+o | IMM64 | 70 | 010 01 |
| st.i8 | rd,sym+o | IMM64 | 72 | 111 01 |
| st.i16 | rd,sym+o | IMM64 | 72 | 010 01 |
| st.iw | rd,sym+o | IMM64 | 25 | |

FIG. 4D

| | | | | |
|---|---|---|---|---|
| st.u16 | rd,sym+o | IMM64 | 72 | 010 11 |
| ld.f | fd,sym(rs1) | REG64 | 70 | 001 10 |
| ld.d | fd,sym(rs1) | REG64 | 70 | 001 11 |
| ld.i8 | rd,sym(rs1) | REG64 | 70 | 111 10 |
| ld.i16 | rd,sym(rs1) | REG64 | 72 | 011 00 |
| ld.iw | rd,sym(rs1) | REG64 | 65 | |
| ld.u8 | rd,sym(rs1) | REG64 | 70 | 111 11 |
| ld.u16 | rd,sym(rs1) | REG64 | 72 | 011 10 |
| st.f | fd,sym(rs1) | REG64 | 70 | 010 10 |
| st.d | fd,sym(rs1) | REG64 | 70 | 010 11 |
| st.i8 | rd,sym(rs1) | REG64 | 72 | 111 10 |
| st.i16 | rd,sym(rs1) | REG64 | 72 | 011 01 |
| st.iw | rd,sym(rs1) | REG64 | 76 | |
| st.u16 | rd,sym(rs1) | REG64 | 72 | 011 11 |
| ld.f | fd,sym+o(rs1) | REG96 | 72 | 110 01 |
| ld.d | fd,sym+o(rs1) | REG96 | 72 | 110 10 |
| ld.i8 | rd,sym+o(rs1) | REG96 | 72 | 100 10 |
| ld.i16 | rd, sym+o(rs1) | REG96 | 72 | 101 10 |
| ld.iw | rd, sym+o rs1) | REG96 | 72 | 100 00 |
| ld.u8 | rd, sym+o(rs1) | REG96 | 72 | 101 00 |
| ld.u16 | rd, sym+o(rs1) | REG64 | 72 | 110 00 |
| st.f | fd,sym+o(rs1) | REG96 | 72 | 110 11 |
| st.d | fd,sym+o(rs1) | REG96 | 72 | 111 00 |
| st.i8 | rd,sym+o(rs1) | REG96 | 72 | 100 11 |
| st.i16 | rd,sym+o(rs1) | REG96 | 72 | 101 10 |
| st.iw | rd,sym+o rs1) | REG96 | 72 | 100 01 |
| st.u16 | rd,sym+o rs1) | REG96 | 72 | 110 10 |
| spill.i | rd,o(rs1) | IMM32 | 50 | |
| spill.f | fd,o(fs1) | EXT64 | 71 | 111 00 |
| spill.d | fd,o(fs1) | EXT64 | 71 | 111 01 |
| reload.i | rd,o(rs1) | IMM32 | 51 | |
| reload.f | fd,o(rs1) | EXT64 | 71 | 111 10 |
| reload.d | fd,o(rs1) | EXT64 | 71 | 111 11 |
| cnst | rd,imm32 | REG64 | 53 | |
| cnst | rd,o+sym | IMM64 | 56 | |
| mov.i | rd,rs1 | REG32 | 10 | |
| mov.i | rd,imm16 | IMM32 | 23 | |
| movx | rd,rs1 | REG32 | 70 | 000 11 |
| movb | rd,rs1,len | REG64 | 70 | 100 10 |
| mov.f | fd,fimm | REG64 | 70 | 100 11 |

FIG. 4E

| | | | | |
|---|---|---|---|---|
| mov.d | fd,fimm | DOUBLE96 | 70 | 101 00 |
| call | rd | REG32 | 52 | |
| call | pcre126 | JUMP32 | 30 | |
| call | sym26 | JUMP32 | 54 | |
| lcall | sym32 | REG64 | 70 | 101 10 |
| jmp | sym26 | JUMP32 | 32 | |
| ljmp | sym32 | REG32 | 70 | 101 01 |
| ijr | rd | REG32 | 75 | |
| tjr | rd | REG32 | 74 | |
| rjr | rd | REG32 | 31 | |
| beq.f | fs1,fs2, pcre130 | REG64 | 73 | 010 00 |
| beq.d | fs1,fs2, pcre130 | REG64 | 73 | 010 01 |
| bne.f | fs1,fs2, pcre130 | REG64 | 73 | 010 10 |
| bne.d | fs1,fs2, pcre130 | REG64 | 73 | 010 11 |
| bgt.f | fs1,fs2, pcre130 | REG64 | 73 | 100 10 |
| bgt.d | fs1,fs2, pcre130 | REG64 | 73 | 100 11 |
| bge.f | fs1,fs2, pcre130 | REG64 | 73 | 100 00 |
| bge.d | fs1,fs2, pcre130 | REG64 | 73 | 100 11 |
| blt.f | fs1,fs2, pcre130 | REG64 | 73 | 011 10 |
| blt.d | fs1,fs2, pcre130 | REG64 | 73 | 011 11 |
| ble.f | fs1,fs2, pcre130 | REG64 | 73 | 011 00 |
| ble.d | fs1,rs2, pcre130 | REG64 | 73 | 011 01 |
| beq.i | rs1,rs2, pcre130 | REG64 | 33 | |
| bne.i | rs1,rs2, pcre130 | REG64 | 40 | |
| bgt.u | rs1,rs2, pcre130 | REG64 | 46 | |
| bgt.i | rs1,rs2, pcre130 | REG64 | 44 | |
| bge.u | rs1,rs2, pcre130 | REG64 | 45 | |
| bge.i | rs1,rs2, pcre130 | REG64 | 43 | |
| blt.u | rs1,rs2, pcre130 | REG64 | 57 | |
| blt.i | rs1,rs2, pcre130 | REG64 | 42 | |
| ble.u | rs1,rs2, pcre130 | REG64 | 47 | |
| ble.i | rs1,fs2, pcre130 | REG64 | 41 | |
| bfins.f | o(rs1) (c1:c2),rd | BF64 | 73 | 001 00 |
| bfins.u | o(rs1) (c1:c2),rd | BF64 | 73 | 001 10 |
| bfins.i | rs1 (c1:c2),rd | BF64 | 73 | 001 01 |
| bfins.u | rs1 (c1:c2),rd | BF64 | 73 | 001 11 |
| bfext.i | rd,o(rs1) (c1:c2) | BF64 | 73 | 000 00 |
| bfext.u | rd,o(rs1) (c1:c2) | BF64 | 73 | 000 10 |
| bfext.i | rd,rs1 (c1:c2) | BF64 | 73 | 000 01 |
| bfext.u | rd,rs1 (c1:c2) | BF64 | 73 | 000 11 |

METHODS FOR SAFE AND EFFICIENT IMPLEMENTATIONS OF VIRTUAL MACHINES

BACKGROUND OF THE INVENTION

1. Field of the Invention

The present invention pertains to the implementation of a safe virtual machine and more specifically to efficient methods of developing such an implementation in software.

2. Prior Art

A virtual machine is an intermediate representation that is not tied to the specific details of a particular computer hardware architecture. Therefore a program which has been written for such a machine can be executed on different systems. Typically a virtual machine will guarantee certain semantics that remain identical regardless of the hardware used to implement it. A sub-class of such machines guarantees that all semantics will remain identical.

Virtual machines differ in their treatment of computer memory. Some virtual machines have a restricted memory model while other virtual machines support a general-purpose memory protection model that allows programs to address memory locations freely. The general-purpose model classifies those memory locations in terms of whether the programs are allowed to access them. The general-purpose model is the basis for virtually every existing hardware architecture and it is relied on by standard programming languages like C and C++.

When a virtual machine with the general-purpose memory model is implemented, the implementation strategy is deemed "safe" if it enforces the protection model, thereby preventing undesirable behavior.

Having a safe and efficient software implementation of a virtual machine with a general-purpose memory model has been a long standing goal in the software industry, which uses virtual machines for many purposes. The fact that a machine embodies a general memory protection model allows it to execute programs written in any standard programming language. These programs can be incorporated safely into mission critical environments like database systems and operating system kernels without concern that they will corrupt other code accidentally or maliciously. Because the virtual machine implementation constrains behavior, the programs can be controlled precisely.

An even more important application for a safe and efficient software implementation of a virtual machine with a general-purpose memory model is the use of such programs across networks, so that they serve as "mobile code". The evolution of the Internet and of local area networks has yielded an environment where programs are distributed and executed remotely. Application programs are typically placed on network repositories, called servers, and various client machines access the servers with the intention of running those programs. The client machines come from a wide range of different hardware architectures. They also may not trust code taken from the servers, so the ability to control the behavior of such code precisely is of key importance. The World Wide Web is an example of such an environment, where public servers are accessed by individuals who explore them across the Internet.

Currently there are serious limitations on the type of code that is made available via the World Wide Web and other network environments, because there has not been an efficient software implementation of a safe general-purpose virtual machine.

The prior art includes a wide variety of virtual machine implementations. Early examples of virtual machines, such as IBM's VM/370, relied on the computer hardware to enforce memory protections. The goal was to give each user the illusion that they were the only person using the machine. For examples of this type of virtual machine implementation, reference is made to Goldberg, "Survey of Virtual Machine Research," Computer, June 1974, vol.7, #6, pp. 34–45, and to J. Buzen and U. Gagliardi, "The Evolution of Virtual Machine Architecture," AFIPS Conference Proceedings, vol.42, National Computer Composition and Exposition, June 1973, pp. 291–9.

Hardware support has also been used by the prior art to present the illusion of a shared memory architecture on a distributed memory machine. One example of prior art that adopts this strategy was called Ivy. See, for example, K. Li and P. Hudak, "Memory Coherence in Shared Virtual Memory Systems," Proceedings of the 5'th ACM Symposium on Principles of Distributed Computing, pp. 229–239, August 1986. This prior art has inspired a large collection of related systems. All of these systems require hardware support and do not use purely software techniques to enforce the memory model.

The use of hardware-based implementations of virtual machines has many disadvantages. For one, such implementations require certain features of the underlying hardware architecture which may not be available. Further, such implementations may also rely on specialized operating system services such as external paging.

A limited way to achieve safety for a particular source language is to introduce certain code sequences during compilation that prevent undesirable actions. For example, Fortran compilers often include an option to detect illegal uses of arrays. More general techniques have been explored for Pascal. See, for example, C. N. Fischer and R. J. Leblanc, "The Implementation of Run-time Diagnostics in PASCAL," IEEE Transactions on Software Engineering, July 1980, vol.SE-6, #4, pp. 313–19. The same is true for C. See, for example, T. Austin, S. Breach, and G. Sohi, "Efficient Detection of All Pointer and Array Access Errors," Proceedings of the ACM Conference on Programming Language Design and Implementation, June 1994. While such diagnostic code prevents certain errors, it is highly specialized to particular features of the source language. There is no support for either a general virtual machine or a general memory protection model.

An approach to implementing a safe virtual machine is to restrict either the source language or the semantics of the virtual machine so that no undesirable events can be generated. One form of restriction is to use a source language that is type-safe. One example is "Java" by Sun Microsystems, Inc. Java uses a virtual machine that is restricted so certain safety properties can be proven. See J. Gosling, "Java Intermediate Bytecodes," ACM SIGPLAN Workshop on Intermediate Representations, January 1995, pp. 111–18. Another type-safe language is "Telescript" by General Magic Corporation. See "Telescript Technology: The Foundation for the Electronic Marketplace," General Magic, Sunnyvale, Calif. 1993.

Another approach is to use a high-level programming language such as LISP that does not support general-purpose pointers. See R. Brooks, R. Gabriel, and G. Steele, Jr., "An Optimizing Compiler for Lexically Scoped Lisp," ACM Symposium on Lisp and Functional Programming, August 1982, pp. 261–75. While restricted languages allow the compiler to prevent undesirable actions that misuse memory locations, most languages used in general practice do not fall into this category.

Another language-based prior art solution takes a general purpose language and restricts it so that the compiler can detect undesirable events. This has been done for a variety of languages, such as Pascal and C++. See D. Luckham, and N. Suzuki, "Verification of Array, Record, and Pointer Operations in PASCAL," ACM Transactions on Programming Languages and Systems, October 1979, vol.1, #2, pp. 226–44, and J. Ellis, and D. Detlefs, "Safe, Efficient Garbage Collection for C++," Proceedings of the USENIX C++ Conference, April 1994, pp. 143–77.

A looser form of language restriction is to allow the program to distinguish a few objects that require special handling when used. An example of this type of language is Emerald. See E. Jul, H. Levy, N. Hutchinson, and A. Black, "Fine-Grained Mobility in the Emerald System," ACM Transactions on Computing Systems, vol. 6, #1, February 1988, pp. 109–133. Emerald supports parallel processing by relying on specialized code sequences to access shared objects.

One strategy for implementing safe virtual machines is to use an interpreter that includes checks to prevent undesirable behavior. For efficiency, many interpreters first convert the program into a compact representation such as bytecodes. Then they use a wide variety of approaches to execute them. Examples of such interpretation strategies include P. Klint, "Interpretation Techniques (High Level Languages)," Software—Practice and Experience, September 1981, vol.11, #9, pp. 963–73, and A. Goldberg and D. Robson, "Smalltalk-80: The Language and Its Implementation," Addison-Wesley, 1983, Reading, Mass. While interpretation is usually applied to languages like LISP that support garbage-collection, it has also been applied to general purpose languages like C. See J. Davidson and J. Gresh, "Cint: A RISC Interpreter for the C Programming Language," Proceedings of the SIGPLAN '87 Symposium on Interpreters and Interpretive Techniques, 1987, pp. 189–197.

Because interpreters are rather slow, many prior art optimization strategies have been developed to improve performance. These prior art strategies include dynamic compilation and inline caching. See L. Deutsch and A. Schiffman, "Efficient Implementation of the Smalltalk-80 System," Proceedings of the Eleventh Annual ACM Symposium on Principles of Programming Languages, January 1984, pp. 297–302, and C. Chambers, D. Ungar, and E. Lee, "An Efficient Implementation of SELF, a Dynamically-Typed Object-Oriented Language Based on Prototypes," LISP and Symbolic Computation, July 1991, vol.4, #3, pp. 243–81. Although such techniques are effective, they are not able to match the efficiency of a general purpose programming language that has been compiled to native code.

Other prior art implementations focus on simulating one computer architecture (possibly an idealized one) on another. The earliest prior art systems used straight-forward interpretation and were very slow. More recent strategies use dynamic compilation and run-time code generation. Examples include Mimic, see C. May, "A Fast S/370 Simulator," Proceedings of the SIGPLAN Symposium on Interpreters and Interpretive Techniques, 1987, pp. 1–13; Shade, see B. Cmelik and D. Keppel, "Shade: a Fast Instruction-Set Simulator for Execution Profiling," ACM SIGMETRICS Conference on Measurement and Modeling of Computer Systems, 1994, pp. 128–37; and VEST, see R. Sites, A. Chernoff, M. Kirk, and M. Marks, "Binary Translation," Communications of the ACM, February 1993, vol.36, #2, pp. 69–81.

These techniques are not safe and efficient software implementations of a virtual machine that supports a general-purpose memory protection model. They are either specialized to particular architectures, use slow techniques to prevent undesirable actions or rely on specialized hardware support.

The prior art can be summarized to include the following approaches. They fall into four general categories. (1) Reliance on the hardware to enforce protection; (2) restrictions on the virtual machine so it cannot support general purpose programming languages; (3) support for a specialized memory protection model; and (4) use of an inefficient software mechanism to enforce memory protection. All of these approaches teach away from the present invention.

None of the prior art techniques represents a safe and efficient software implementation of a virtual machine that supports a general purpose memory protection model. There are many applications in the computer industry for such an implementation.

For example, one application is to distribute computer programs using network protocols like the World Wide Web to provide universal access to executable programs from different types of computers. An application program can be placed on a server machine and then accessed and executed by many different types of client machines. Currently there are serious limitations on the type of code that is made available via the World Wide Web and other network environments because there has not been an efficient software implementation of a safe general-purpose virtual machine. The availability of such an implementation could fundamentally alter software distribution across computer networks to support arbitrary programs produced from standard programming languages. Such an application would rely on the portability of the virtual machine, complete control over the behavior of the code, and efficiency of execution.

Another use of a safe and efficient software implementation of a virtual machine that supports a general purpose memory protection model would be to extend mission-critical programs like database systems and operating system kernels with new functionality while enforcing a safe memory protection model. The safety model of the virtual machine protects the systems from undesirable actions by programs executing on the virtual machine.

A third use of a safe and efficient software implementation of a virtual machine that supports a general purpose memory protection model is to store program fragments in databases so that they can be retrieved and executed safely on remote machines that may have a completely different hardware architecture.

All of these applications represent an important step forward in the evolution of computer software to meet the needs of todays' computer users. Thus, there has been a long felt need for an efficient, software-based implementation of a virtual machine that supports a general purpose memory protection model.

SUMMARY OF THE INVENTION

The present invention is an efficient implementation of a safe virtual machine that implements a general purpose memory protection model. The present invention implements this safe virtual machine by using software fault isolation and compilation. The entire mechanism is implemented safely and efficiently without any hardware support.

An object of the various embodiments of the present invention is to efficiently implement a safe virtual machine that embodies a general purpose memory protection model.

The invention is broadly useful in a variety of contexts because it allows a single executable program to be generated from source code written in general purpose languages. The program can be compiled for a universal virtual machine with rich protection semantics. This same executable can then be used on many different architectures and its behavior can be controlled precisely.

In the various embodiments of the present invention, a software approach is disclosed that implements a safe virtual machine with a general-purpose memory protection model. The invention translates virtual machine instructions into the native instructions of the underlying hardware. During translation, a technique called software fault isolation introduces instructions to enforce a general purpose memory protection model. An important advantage of the present invention is that it executes safe virtual machine programs at nearly the same speed as ordinary natively compiled programs without relying on any special architectural features of the hardware. The present invention also relies on a series of optimizations to yield extremely efficient performance.

The present invention includes a method for preventing transfer of control to illegal memory addresses during execution of a sequence of virtual machine instructions which operates in a computer system having memory. The method comprises the steps of generating a sequence of machine executable instructions that carry out the operations defined by the sequence of virtual machine instructions. Status information is provided in a computer storage medium that indicates the illegal memory addresses which the sequence of virtual machine instructions is not allowed to transfer control to. This status information also indicates the legal memory addresses which the sequence of virtual machine instructions is allowed to transfer control to.

The sequence of virtual machine instructions is analyzed. Then, a sequence of machine executable instructions to carry out operations defined by the sequence of virtual machine instructions is generated based upon this analysis. Those machine executable instructions that can cause transfer of control to the illegal memory addresses are encapsulated with a predetermined sequence of machine executable checking instructions so that the predetermined sequence of machine executable checking instructions is executed in conjunction with the machine executable instruction that can cause modification of the illegal memory addresses.

The predetermined sequence of machine executable checking instructions signal an error if the machine executable instruction that can cause transfer of control to the illegal memory addresses attempts to transfer control to one of the illegal memory addresses.

The invention also provides a method for preventing modification of illegal memory addresses during execution of a sequence of virtual machine instructions operating in a computer system having memory. The method comprises the steps of generating a sequence of machine executable instructions that carry out the operations defined by the sequence of virtual machine instructions. Status information is provided in a computer storage medium that indicates the illegal memory addresses which the sequence of virtual machine instructions is not allowed to modify. This status information also indicates the legal memory addresses which the sequence of virtual machine instructions is allowed to modify.

The sequence of virtual machine instructions is then analyzed. A sequence of machine executable instructions to carry out operations defined by the sequence of virtual machine instructions is generated based upon this analysis. Those machine executable instructions that can modify the illegal memory addresses are encapsulated with a predetermined sequence of machine executable checking instructions so that the predetermined sequence of machine executable checking instructions is executed in conjunction with the machine executable instructions that can modify the illegal memory addresses.

The predetermined sequence of machine executable checking instructions signal an error if the machine executable instruction that can cause modification of the illegal memory addresses attempts to modify one of the illegal memory addresses.

The novel details of these optimizations and of the general implementation mechanism will now be more particularly described with reference to the accompanying drawings and pointed out in the claims. It will be understood that the particular embodiments of the invention are shown by way of illustration only and not as limitations of the invention. As will be understood by those skilled in the art, the principles and features of this invention may be employed in various and numerous embodiments without departing from the scope of the invention.

BRIEF DESCRIPTION OF THE DRAWINGS

Reference is made to the accompanying drawings in which are shown illustrative embodiments of aspects of the invention, from which novel features and advantages will be apparent.

DETAILED DESCRIPTION OF THE PREFERRED EMBODIMENTS

With reference to the figures, the presently preferred methods of implementing a safe virtual machine in software will now be described.

Figure 1:
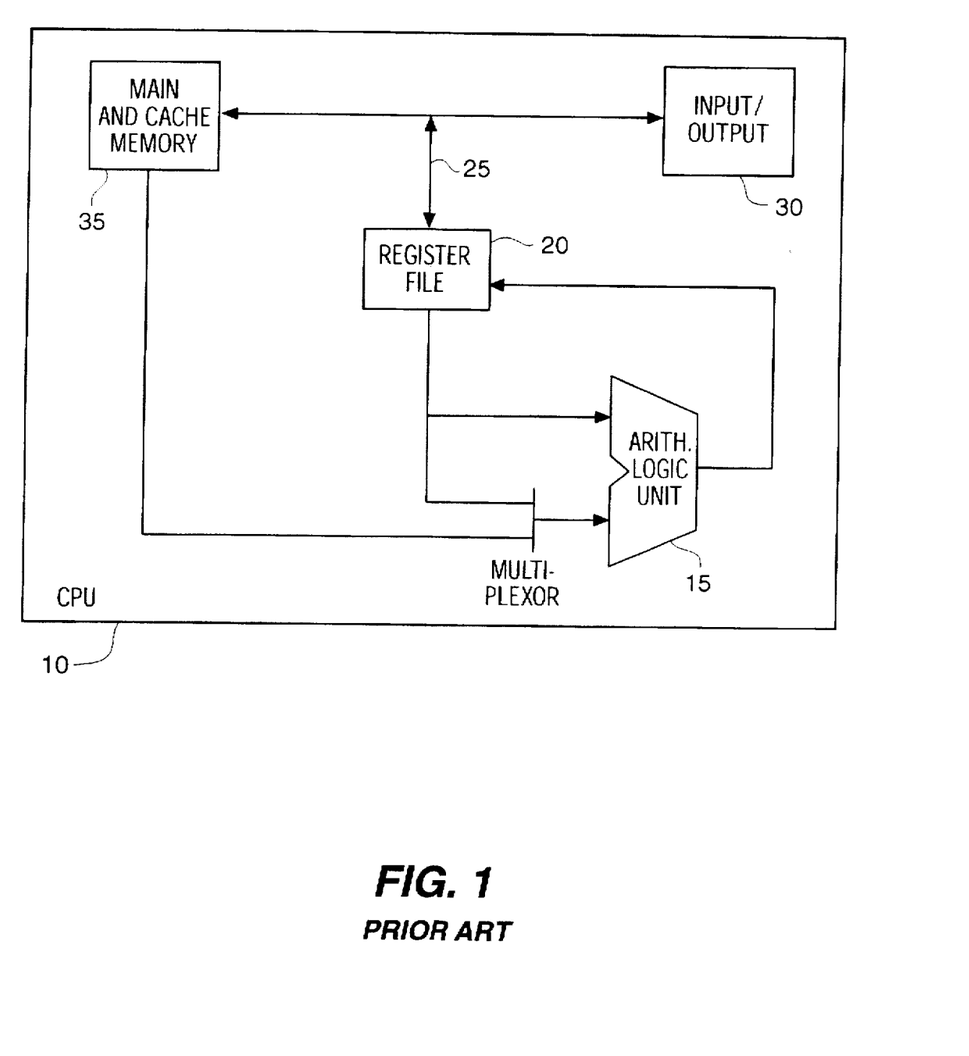
FIG. 1 shows a block diagram of a central processing unit.

With reference to FIG. 1, a central processing unit 10 (hereinafter "cpu") of the prior art will be briefly discussed. As is known to those of ordinary skill in the art, a cpu comprises an arithmetic logic unit 15 that performs computations, a register file 20 that saves computed values and data transfer paths 25 to input/output devices 30 and the main and cache memory 35 of the processor. Those of ordinary skill in the art will recognize that this is an extremely simplified description of a cpu and that other architectures, while different in application, are fundamentally similar to the description included herewith.

The present invention is dedicated to the efficient software implementation of a virtual machine embodying a general memory protection model. A virtual machine is a widely used technique for supporting portability; once a program has been expressed in terms of this machine, that program can be executed on any machine that contains an implementation of the virtual machine. The basic requirement is that each virtual machine implementation support the correct semantics, whatever those semantics have been defined to be by the designer of the virtual machine, so that when the program is executed, it will behave as the programmer intended regardless of the underlying hardware. Virtual machines enable computer code to be portable across architectures.

The present invention uses a set of software techniques to implement a virtual machine that supports a general memory protection model. A first embodiment of the present invention is to use compilation to convert the virtual machine instructions to the native instructions of the hardware architecture. A second embodiment of the present invention is the use of a technique known as software fault isolation which incorporates instructions during the compilation in order to prevent undesirable actions. A third embodiment of the present invention is to extend the software fault isolation technique to support a general memory protection model. A further embodiment is to use a series of optimizations during conversion to achieve very high efficiency.

Figure 2:
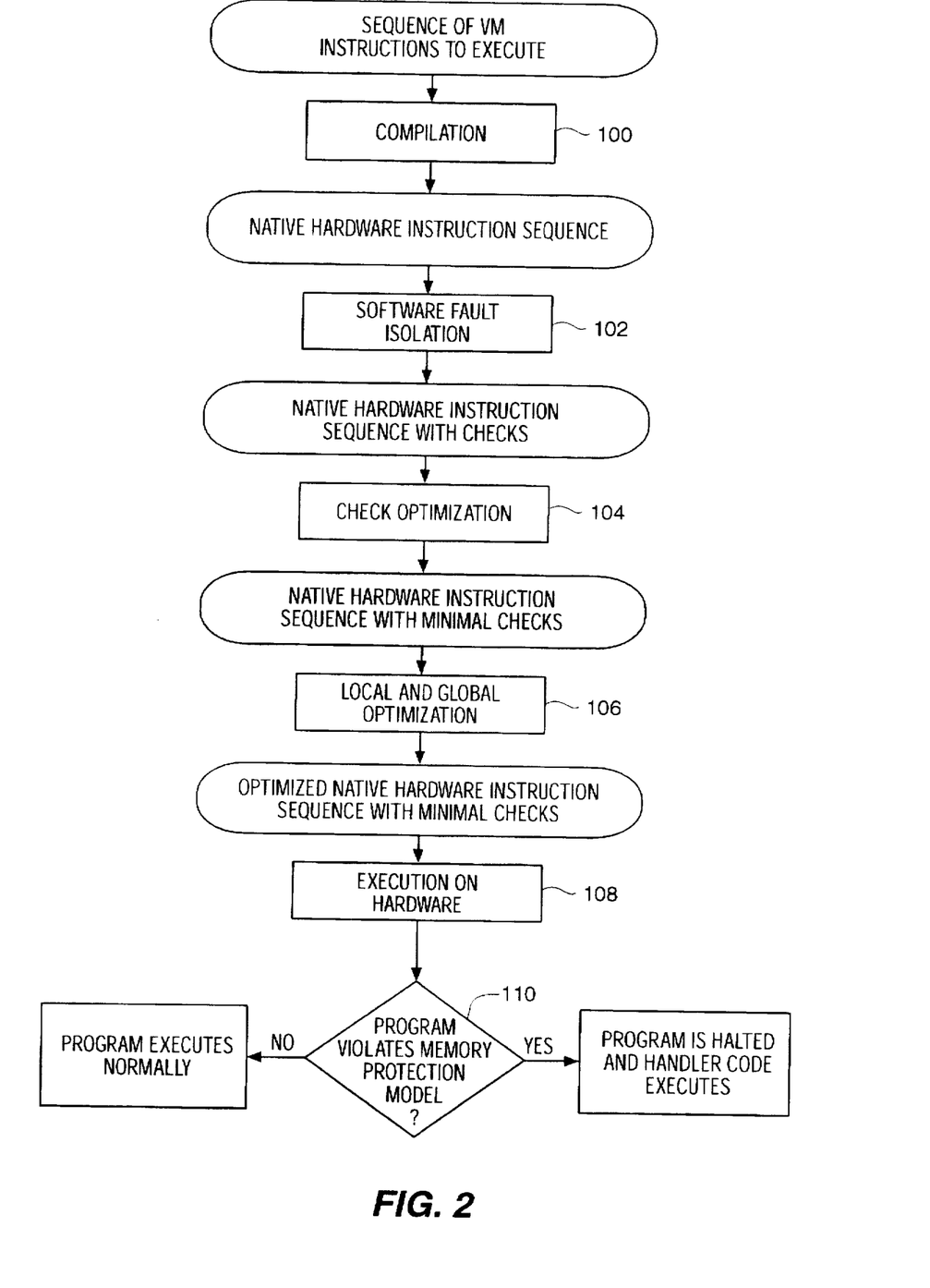
FIG. 2 shows a flow chart illustrating the concepts of the present invention.

With reference to FIG. 2, an implementation of the present invention will now be discussed. It will be apparent to one of ordinary skill in the art that this discussion provides but one way to organize the process. One could combine and reorder the various steps without departing from the teachings of the invention.

FIG. 2 outlines the steps by which the present invention implements a particular virtual machine program. The process begins with the sequence of virtual machine instructions that make up the program to be executed. Step 100 compiles those instructions into a sequence of native hardware instructions that performs the same computation as the original program.

Step 102 uses software fault isolation to introduce checks that will prevent undesirable behavior. The output continues to perform the same computation as the original code.

Step 104 performs optimization algorithms that reduce the number of checks present in the code sequence and outputs the result.

Step 106 performs local and global optimizations on the instruction sequence to improve its performance. Instructions are removed, replaced, and reordered. However, the output continues to perform the same computation as the input sequence.

Step 108 executes the code on the hardware. As shown in step 110, if the program does not violate the protection model of the virtual machine, it will execute normally. However, if it attempts to perform an undesirable action, execution is halted and control is passed to a specified handler routine that takes appropriate action.

Figure 3:
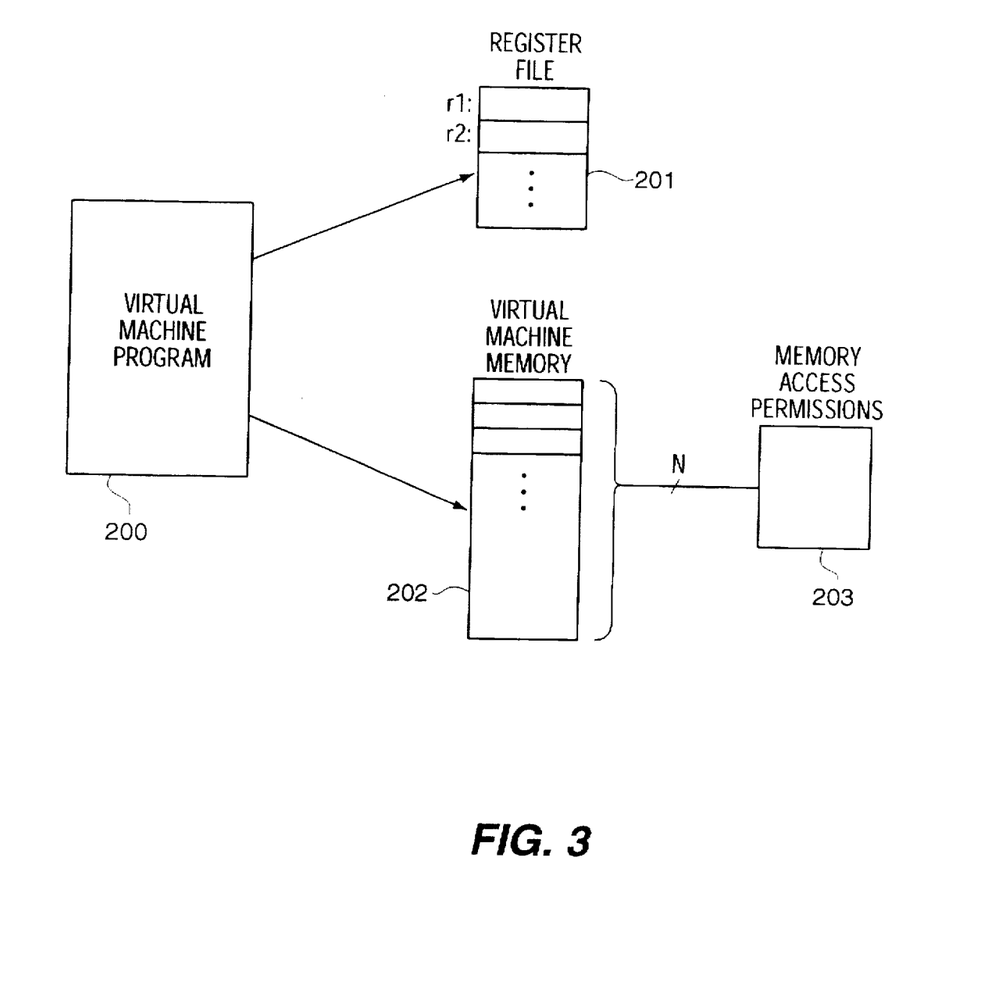
FIG. 3 is a block diagram of an architecture of a virtual machine.
Figure 4B:
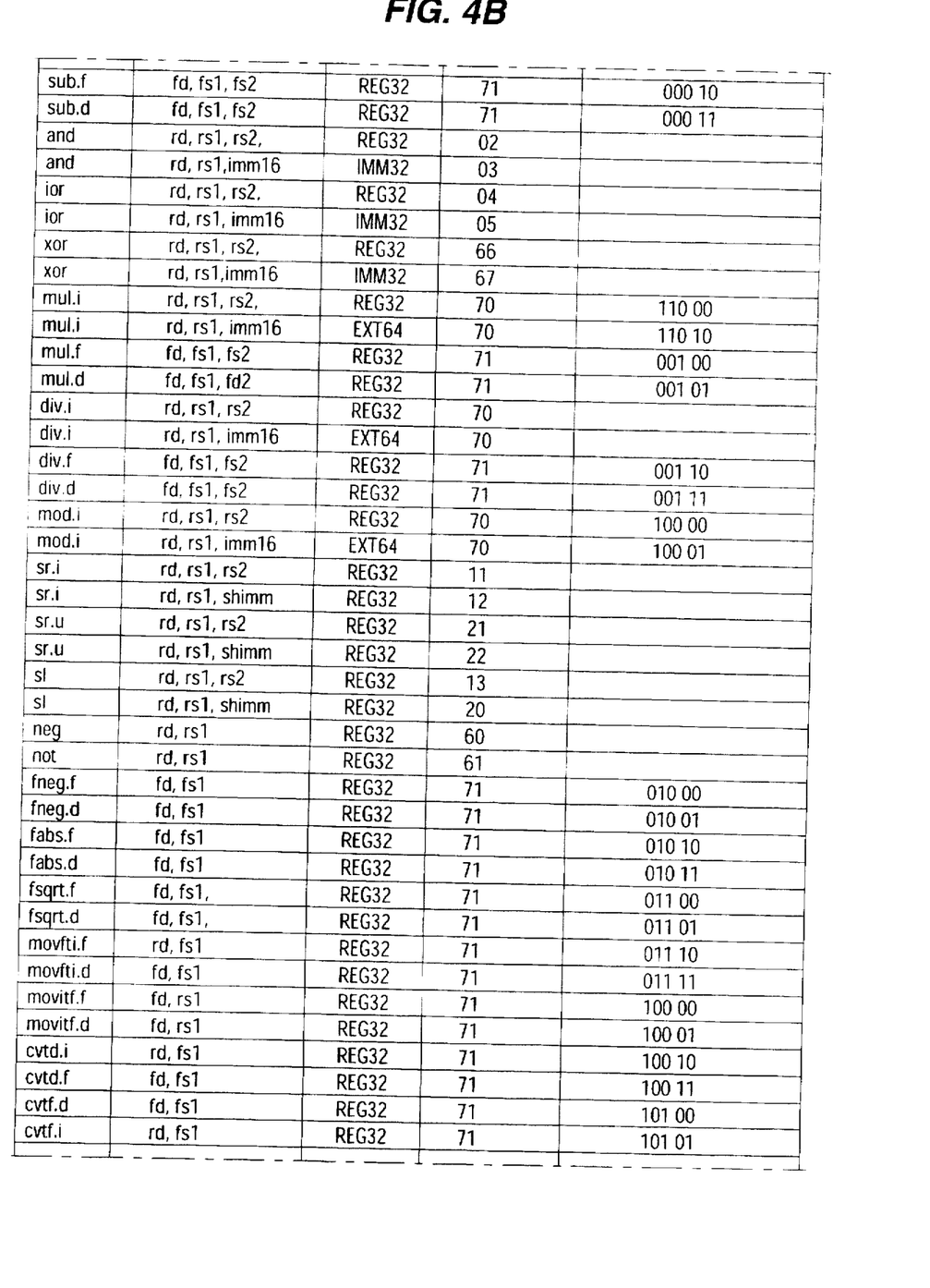
FIG. 4 is a non-exhaustive list of the virtual machine instructions that are used in a preferred embodiment of the invention.
Figure 4C:
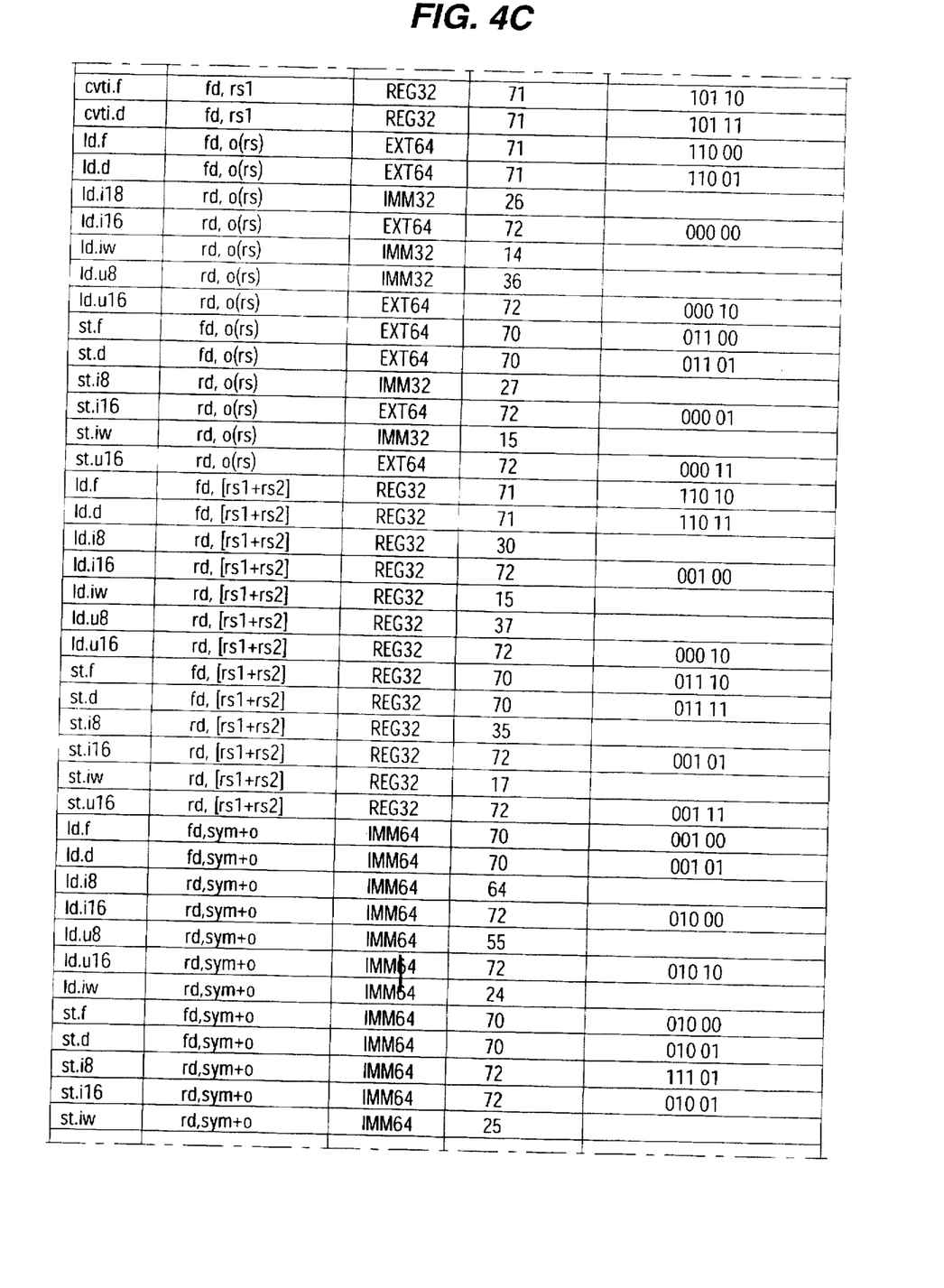
Figure 4D:
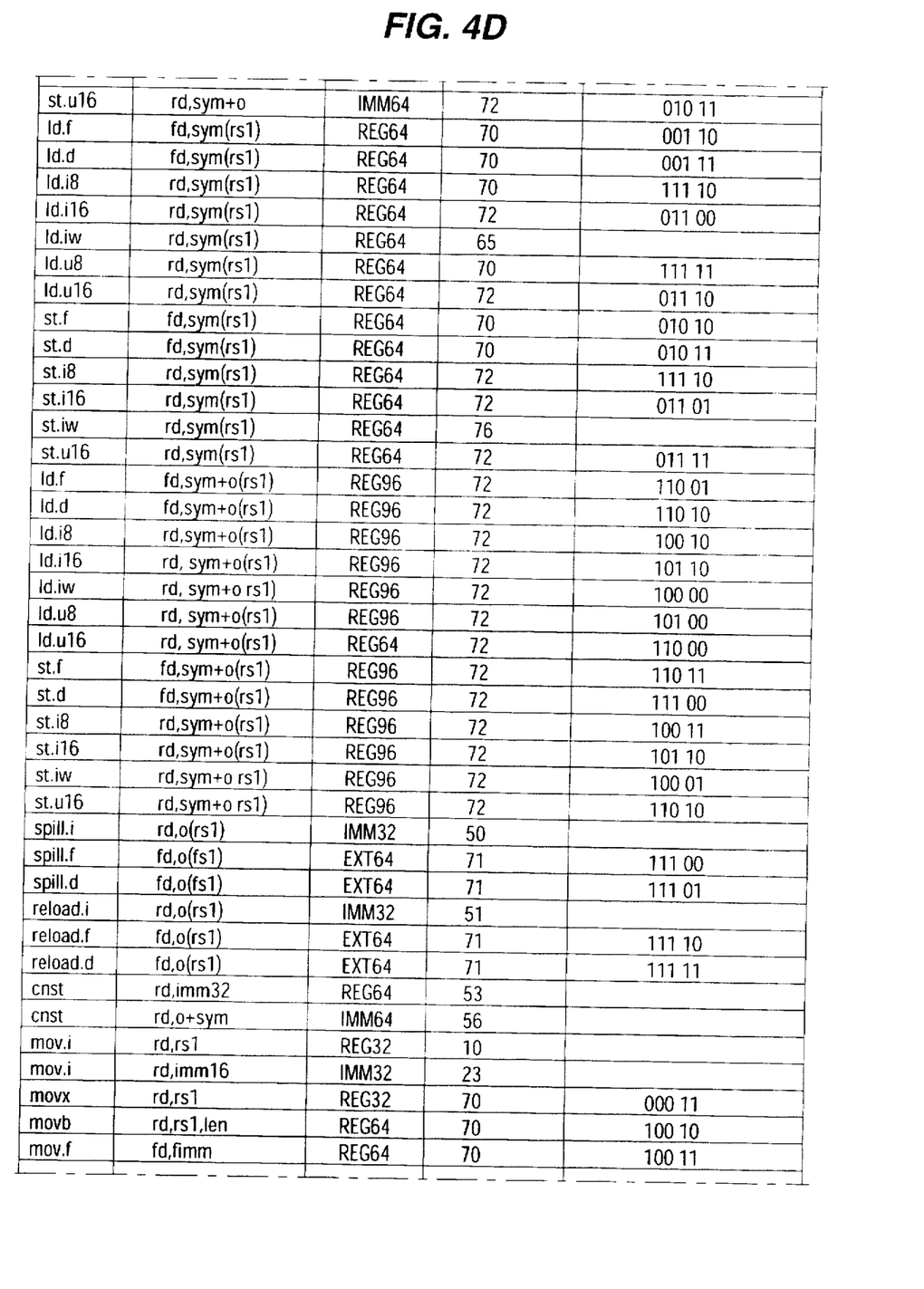
Figure 4E:
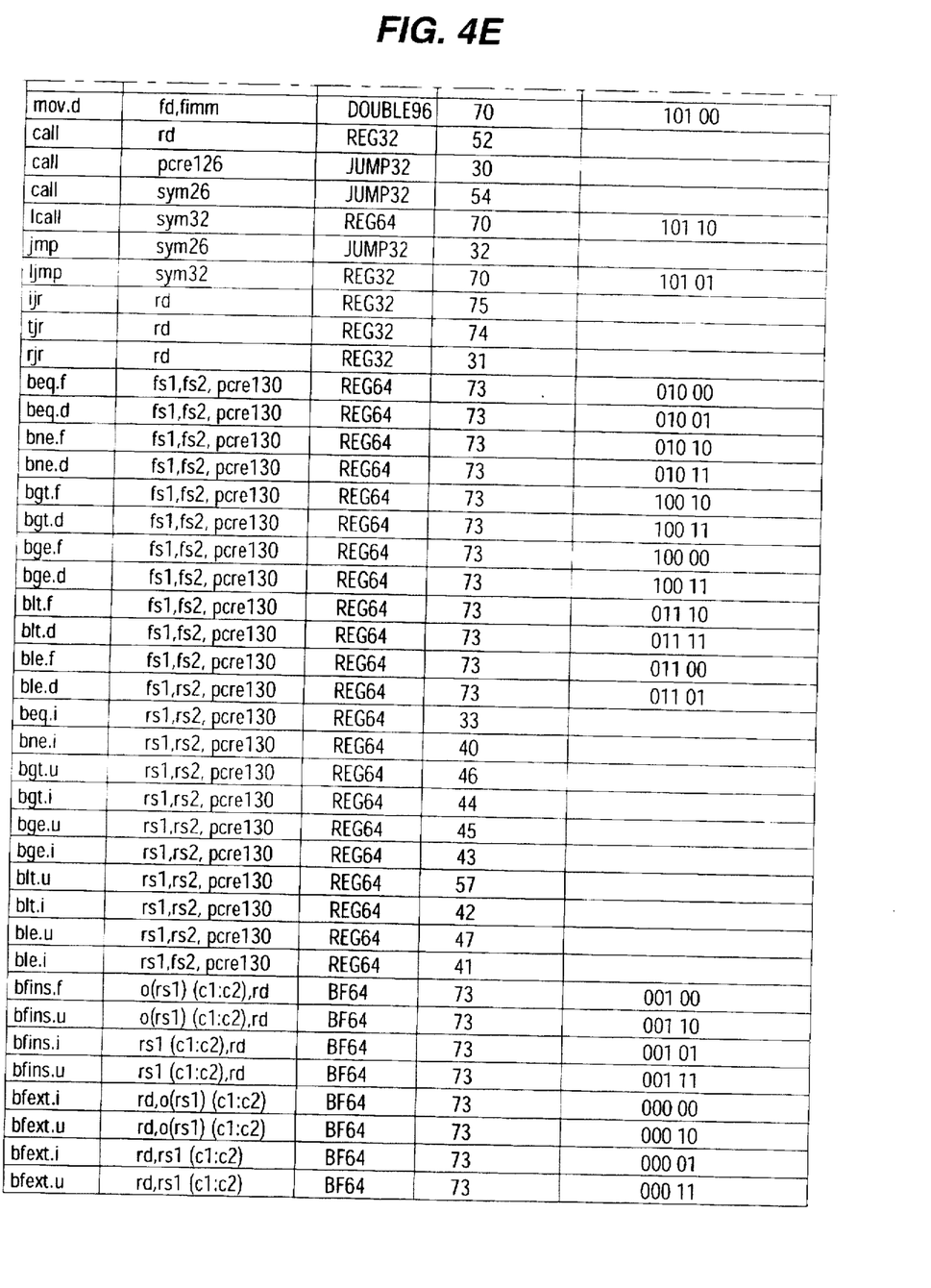

The architecture of the virtual machine of the present invention will now be discussed. The various embodiments of the present invention are discussed with respect to a particular virtual machine that strongly resembles a conventional reduced instruction set computing (RISC) hardware architecture. The architecture of this virtual machine will be discussed with reference to FIG. 3. FIG. 3 represents a program running on the virtual machine that is implemented by the present invention. The program 200 consists of a sequence of virtual machine instructions. These instructions manipulate the contents of the register file 201 and memory 202. Attempts to use memory must conform to the protection model, which is represented by a set of permissions 203. If memory is used in violation of those permissions, execution of the instruction sequence is halted and control passed to a handler routine that takes appropriate action. Although the invention is described with reference to a RISC-like virtual machine architecture, one of ordinary skill in the art will recognize that the various embodiments of the present invention would be of equal benefit in supporting virtual machines that resemble complex instruction set computing (CISC) architectures or that embody higher level programming models and intermediate representations.

A program expressed in the virtual machine supported by the present invention consists of a sequence of instructions that manipulate the current state of the machine. This sequence is also annotated with sufficient additional information to reconstruct the control flow paths that may be traversed when the instructions are executed.

The memory model supported by the virtual machine described above consists of a linear sequence of locations that are divided into blocks of a fixed size. The access rights of a program are defined on a per block basis, much the same way that conventional techniques segment memory into pages and define a permission level for each page. While such an organization of memory is the most common approach, one of ordinary skill in the art will recognize that the various embodiments of the present invention would be of equal benefit in supporting other memory decomposition strategies. The basic requirement is that the model define, for an arbitrary memory location, whether the virtual machine program is permitted to access it. The embodiment described here maintains information for each location as to whether it can be read or written by the virtual machine instructions, and whether it is permissible for control to be transferred to it.

To execute a virtual machine program, the present invention compiles the sequence of instructions into the equivalent native instructions of the underlying hardware. The terms "compile", "convert" and "translate" are used interchangeably herein. The virtual machine instruction set that is used in a preferred embodiment of the invention is similar to a conventional RISC instruction set, though it has been enhanced with higher order operations (like memory block copy and bitfield operations) and with a more complex set of addressing modes. A non-exhaustive list showing this instruction set is in FIG. 4.

These higher order features provide additional flexibility during conversion so that the resulting code will be correct and efficient on a wide range of different architectures. CISC architectures like the Intel x86 architecture benefit most dramatically from the higher order operations. However, RISC architectures can also use these optimization techniques to improve performance.

For example, unlike a traditional RISC architecture, the virtual machine includes bitfield instructions that can access memory directly. The following instruction is an example:

bfext.uw n0,4(n1){26:3}

This instruction extracts bits 26, 27, and 28 from a word in memory, zero-extends the result, and places it in register n0. The address of the word in memory is computed by adding 4 to the value in register n1.

If a bit-field manipulation sequence was generated using only RISC components, it would either have to contain a data-format dependent sequence of load, logical-and, shift, and logical-or instructions, or it would have to contain code that conditionally executes the correct sequence of RISC instructions. The first option yields code that does not run correctly on every target machine. The second sacrifices performance for correct execution. Using the bitfield instructions, sequences can contain universally correct code that is efficiently translatable to many different architectures.

Another optimization strategy applies to the complex addressing modes that are supported by the virtual machine. During compilation, the present invention is able to choose instructions and to decide whether to reload or recompute various quantities based on the performance trade-offs of a specific hardware processor.

Another feature of the virtual machine representation used in the present invention is that it contains a set of annotations which provide sufficient information to derive the control flow through a particular virtual machine program. These annotations are similar to the information that is typically encoded into the debugging symbols of an object module by a traditional compiler. In particular, the annotations define procedure entry points, distinguish virtual machine instructions from data declarations, identify which registers are live at control transfer points, and identify the types of values that are passed via function calls.

To translate a particular virtual machine instruction, a preferred embodiment replaces the instruction with an equivalent sequence of machine instructions. In some cases, a single virtual machine instruction can be translated into a single hardware instruction. An example is the simpler form of the LOAD instruction. LOAD copies a particular value from a memory location into a virtual machine register. It supports a variety of addressing modes that describe the memory location which contains the value. Simple address LOAD operations can usually be performed with one hardware instruction. However, if the memory location is described using a complex addressing mode, translation to a RISC processor will typically involve several instructions.

A preferred embodiment can use a variety of strategies to carry out the translation, including a template-driven strategy. This embodiment relies on various templates, each of which is responsible for converting a particular virtual machine instruction or addressing mode into the equivalent sequence for the underlying hardware. The translation proceeds through the virtual machine instructions. For each instruction, the translation selects the corresponding templates and outputs the associated instructions.

As the virtual machine instructions are translated, the resulting code sequences contain operations that can engage in undesirable behavior. In particular, the resulting instructions may transfer control to illegal areas in memory or they may attempt to use memory in violation of the restrictions defined by the protection model. These possibilities are raised by the fact that the virtual machine permits access to memory locations so that it can support general-purpose programming languages. To enforce the protection model and prevent undesirable behavior, the translation process of the present invention incorporates a technique the inventors refer to as "software fault isolation". Examples of software fault isolation can be found in R. Wahbe, S. Lucco, T. Anderson, S. Graham, "Efficient Software-based Fault Isolation," Proceedings of the Symposium on Operating System Principles, December, 1993, pp. 203–216. This paper is hereby incorporated by reference. The present invention introduces special code sequences known as "checks" into the translated machine instructions.

Software fault isolation ensures that any attempt to engage in undesirable behavior will halt execution of the instruction sequence. Software fault isolation introduces checks into the sequence that are applied to the value in a register. After a check, an attempt to use that register to violate the memory protection model of the virtual machine will cause a trap.

A preferred embodiment can use a variety of instruction sequences to implement a check. The embodiment described herein applies checks to a distinguished subset of the registers called the "dedicated registers". Using dedicated registers yields a particularly efficient check implementation. However, one of ordinary skill in the art will recognize that a check sequence can also be applied to general-purpose registers without departing from the inventive concepts disclosed herein.

During translation from virtual machine instructions into the equivalent sequence of native hardware instructions, a preferred embodiment assures that any instruction which may have undesirable behavior uses one of the dedicated registers. Software fault isolation is used to interpose a check between the point that a dedicated register is set and any possible use of it. As an example, the following code sequence is provided:

mov DR, r1 st [DR], r2

The first instruction of this example is based on the opcode "mov", which moves a value between registers. In this case, it sets the value of the dedicated register DR based on the value in the register r1. The second instruction of this example uses the "st" opcode, which stores to memory. In this case, it takes the value from the r2 register and copies it to the memory location whose address is contained in the register DR. The store operation is unsafe, because the address could be anything—in general, the value of r1 cannot be known until the code is executed. The software fault isolation of the present invention transforms the code by inserting a check on the dedicated register DR as follows:

mov DR, r1

[check DR]

st [DR], r2

Thus, whenever the first instruction is executed, the check that was inserted will be performed before the unsafe store instruction can be performed. Therefore, it is impossible for this update to the dedicated register to be used to perform an undesirable behavior. Any attempt to perform the undesirable is behavior will cause execution to halt.

A distinctive aspect of the software fault isolation of the present invention is the specific type of check used. In the preferred embodiment of the invention, the sequence enforces a general purpose memory protection model and ensures that any attempt to engage in undesirable behavior that violates that model will cause the instruction sequence to halt.

The exact sequence of instructions in a check differs somewhat between architectures, but the following idealized sequence will properly implement a check on most RISC processors. This sequence is applied to a memory address that will be used by the module to store a value. For example, the invention might insert the check into the following code sequence, using the notation described previously:

mov DAR, r1 st [DAR], r2

The first instruction sets the dedicated addressing register DAR to a value stored in a register. The second instruction performs an indirect write operation through DAR to store a register value into memory. The store instruction is unsafe, meaning that it can engage in undesirable behavior, because r1 might have contained an illegal address that the module is not allowed to modify.

To implement a general protection model, a permission table can be used that is similar to a traditional operating system page table. The present invention constructs these permission tables before a virtual machine program is executed and maintains them to reflect the current access permissions of the program to various parts of the virtual machine memory. The virtual machine memory is divided into blocks, and the tables contain mappings from each block number to the current permission level. The code sequence used in the above example is attempting to modify a memory location, so the check that is inserted uses the permission table that tracks write access to virtual machine memory locations.

Permission tables consist of a series of bytes, each of which has a value of either 0 or −1. A zero indicates that the virtual machine program is legally entitled to access the corresponding block of virtual machine memory, and a −1 indicates that it is not so entitled.

The following is the code from the previous example as modified by the present invention. A check has been inserted before the memory write operation to enforce the virtual machine protection model:

mov DAR, r1 ; same as before
    srl DIR, DAR, 17 ; shift to expose page address
    ldsb DIR, [DIR+DTR] ; load sign-extended byte from table
    or DAR, DIR, DAR ; or result into address
    mov DIR, −1 ; to maintain invariant
    st [DAR], r2 ; attempt store operation This sequence depends on three dedicated registers:
(1) DAR—The dedicated address register which is used for instructions that attempt to write to a memory location;
(2) DTR—The dedicated table register that points to the base of the permission table for memory writes; and
(3) DIR—The dedicated index register that is used to pick an appropriate value out of the permission table.

The first instruction, "mov DAR, r1", sets the address register to the desired address. Note that this register is now in a dangerous state because it might contain an illegal value. The next instruction, "srl DIR, DAR, 17", is the beginning of the check sequence which was inserted by the present invention. This instruction uses the "srl" opcode which shifts the bits in a register to the right. The first argument is the target register, the second is the source register, and the third is the size of the shift. The operation reveals the block id of the desired address. This example uses 17, meaning that the 32-bit address space has been divided into blocks of size 2^17 so that the remaining 15 bits make up the block id. The permission table, therefore, is 2^15 bytes in size. The result of the shift operation is left in the dedicated register DIR.

The next instruction, "ldsb DIR, [DIR+DTR]", loads the appropriate value from the permission table. The instruction uses "ldsb", which loads a byte from memory using the second argument as the address, sign extends it, and stores the result in a register. After the instruction is executed, the value of the DIR register will either be 0 or −1 depending on the value in the table. The next instruction, "or DAR, DIR, DAR", uses the "or" opcode, which computes the logical-or of the two registers specified by the second and third arguments. It stores the result of the computation in the register specified by the first argument. In this case, the instruction computes the logical-or of the DIR register and the desired address. If the permission table contained a zero, the address is left unchanged. Otherwise, the address becomes −1, which is an illegal address and will cause execution to be halted when the address is used for a memory operation.

Conditional jumps are quite slow on many modern processors, so using −1 and allowing the module to attempt a memory operation is usually much more efficient than testing for legality and using a branch. However, one of ordinary skill in the art will recognize that a check sequence could also use a different strategy, such as testing legality and branching to handler code, without departing from the inventive concepts disclosed herein.

The last instruction in the check, "mov DIR, −1", resets the DIR to −1. At this point, the check is complete, and the code sequence can attempt to use the value left in DAR in a store operation. If the appropriate permission holds for the address, the attempt will succeed. If not, control will be transferred to an appropriate handler.

This particular check sequence demonstrates an important property that ensures safety and enables a variety of optimizations. Specifically, this check is designed so that a program which has a legal value in all of the dedicated registers can jump into the middle of the check without violating the memory protection model. Even though the virtual machine is unrestricted, programs that are expressed in it cannot engage in undesirable behavior that violates the protection model after they have been translated and checks have been introduced into the resulting instruction sequences.

Translating the virtual machine instructions and adding checks yields a sequence of instructions that can be executed on the hardware directly and that implements a virtual machine which incorporates a general memory protection model. However, the performance is limited by a straightforward substitution of code sequences. In order to improve performance, a preferred embodiment of the invention applies a series of optimizations to the instruction sequences so that they are nearly as efficient as a program which was compiled directly for the hardware. These optimizations maintain the requirement that all undesirable actions violating the memory protection model will continue to be prevented.

The first optimization is applied to basic blocks to eliminate checks that are unnecessary. Basic blocks are sequences of instructions that do not contain branch targets within them. Basic blocks are often distinguished by compilers during optimization because the restricted control flow permits certain transformations to be applied.

The optimization is termed "check hoisting" and it combines more than one check together. By looking upwards at the possible control flow paths, the present invention, depending upon the program, often discovers that a check that was inserted during software fault isolation is subsumed by a previous one. For example, once an address is loaded into a dedicated register the translated instruction sequence may indirectly write through the dedicated register many times. Since the value in the dedicated register remains unchanged, one check is sufficient for all of the write instructions. In addition, it is sometimes possible to move a check outside of a loop if the address being checked does not vary.

Check hoisting is always legal, as long as the check is not moved through a set or above the target of an explicit jump instruction. Such code motion will not violate the invariant that there is a check between every instruction that sets a dedicated register and any unsafe instruction that uses it. Computed jump instructions similarly maintain the invariant because every dedicated register is always checked before such a jump can be made.

The second optimization is to use a dedicated stack register. Stack addressing is the most frequent source of indirect addressing instructions. Stack addressing is highly stylized because it usually takes the form "sp+c", where sp is the stack pointer and c is a small positive integer. A preferred embodiment makes the stack pointer a dedicated register. When the stack pointer is assigned a value, the invention checks that value to ensure that it is legal. The stack pointer can then be used freely for loading and storing at static offsets without further checks.

Because the stack is used so heavily, this one optimization removes seventy-five percent of the checks from debugging code and approximately forty percent from optimized code.

In addition to the two optimizations outlined above, a preferred embodiment also performs local and global optimizations on the sequence of instructions generated during translation. These optimizations are commonly used by compilers to improve the code sequences that they generate but are rarely used in the implementation of virtual machines. The reason these optimizations are rarely used to implement virtual machines is that many of them require full information about the behavior of the code and are normally only feasible at the time of source code compilation. The present invention allows these optimizations to be applied to virtual machine translation as well, permitting additional performance improvements. Prior art virtual machines, in general, do not contain sufficient information to derive the full control flow graph of a sequence of virtual machine instructions. By incorporating the annotations described above, the virtual machine supported by the present invention does not suffer from that limitation. Both local and global optimizations can be applied to the translated instruction sequences.

Local optimizations improve a particular sequence of instructions within a restricted part of the program. In particular, the present invention performs local instruction scheduling to rearrange code sequences for the scheduling policy of the underlying hardware processor. When there is a delay slot, the present invention will attempt to fill it using instructions that precede or follow the branch target. Pipeline scheduling and peephole optimizations further improve the sequences.

A preferred embodiment can also apply global optimizations that depend on the control flow graph of the program. These optimizations include delayed and global register allocation, reorganization of code and data layout to target the cache, and reduction in the number of memory spill and reload operations.

A useful property of the present invention is that after it has been applied, it is possible to verify that the resulting instruction sequence is incapable of engaging in undesirable behavior. This property allows the conversion process to be carried out remotely and only the result transmitted to the local machine that will execute the program. The local machine can verify that the code being sent is safe before executing it. This procedure is particularly well suited to local machines of limited computational power, such as a personal digital assistant (known as a PDA) or an adjunct to a television (known as a set-top box).

For the particular embodiment of the invention described above, the verification process examines a translated sequence of instructions to ensure that three invariants hold:
1. Every unsafe instruction must use an appropriate dedicated register.
2. In the dynamic flow graph of the program, every path that contains a statement which sets the value of a dedicated register must contain a check before that path reaches a use of the register.
3. Every check is a recognized sequence that is known to ensure safety as described previously.

A preferred embodiment carries out verification by scanning the instruction sequence. The first invariant is revealed by examining register usage to ensure that no instruction violates the restriction.

The second invariant can be verified in a variety of ways, the most straightforward of which is to use conventional dataflow reaching analysis. Such an analysis returns a set of paths from instructions that set a dedicated register to instructions that use it, without a check interposed between them. If this set does not contain any members, the property is shown to hold.

The third invariant can be verified by examining each check sequence to ensure that it belongs to a small set which are known to the system.

As would be apparent to those of ordinary skill in the art, there are other embodiments which verify these invariants without departing from the inventive concepts disclosed herein. Verification ensures that fault isolation has been applied correctly, so that a sequence that has been verified is known not to be able to engage in undesirable behavior.

The preferred embodiment that has been described herein yields extremely efficient performance on a variety of architectures. The ultimate goal of implementing a safe virtual machine in software is to match the performance of native compilers that rely on memory protection hardware to enforce a protection model. There are two factors that complicate this goal. First, software fault isolation check sequences are being executed after translation. This represents additional code that must be executed. Second, some compiler optimizations depend on the target hardware and, hence, cannot be applied profitably to code that is expressed in terms of an abstract virtual machine.

A preferred embodiment of the present invention addresses these two issues separately. While some checks will inevitably be necessary, many of them are optimized away by the techniques discussed previously. Furthermore, as was demonstrated earlier in an example, the check sequences themselves are short and efficient. The second problem is addressed by applying optimizations to the translated instruction sequences. The result is extremely efficient performance across different architectures.

The following table describes the performance that has been achieved on two representative architectures using the embodiments of the present invention. The table compares a set of application programs that have been compiled in two different ways. The first strategy uses the standard optimizing compiler for the architecture to directly compile the source code into native hardware instructions. The second strategy uses the embodiments of the present invention to translate from abstract virtual machine instructions to an equivalent and safe sequence of native instructions. Each number in the table is the ratio of the performance of the second strategy to the performance of the first.

Ratios are given for two architectures: the Sun Microsystems, Inc. SPARC, a widely used RISC processor, and the Intel Corporation x86, the most widely used non-RISC processor. Together, they are good representatives of the processing units that are used in current computers. The application programs are taken from the SPEC92 benchmark suite, which is the standard metric by which computer performance is measured in the industry.

As the numbers reveal, the overhead for using the translation strategy of the present invention is extremely low.

|  | SPARC | x86 |
| --- | --- | --- |
| li | 1.06 | 1.14 |
| compress | 1.05 | 1.03 |
| alvinn | 1.10 | 1.30 |
| eqntott | 1.04 | 1.08 |

Note that in every case, the translated code performs within 30% of the speed of natively compiled code. On average, and for RISC processors, the overhead is much lower.

Thus, a preferred mechanism has been described that represents an efficient software implementation of a safe virtual machine with a general-purpose memory protection model. By compiling the virtual machine instructions, introducing specialized software fault isolation checks, and optimizing the resulting sequences, the present invention is the first system that delivers nearly the full performance of the underlying hardware while preventing virtual machine code from engaging in undesirable behavior.

While embodiments and applications of this invention have been shown and described, as would be apparent to those skilled in the art, many more embodiments and applications are possible without departing from the inventive concepts disclosed herein. The invention, therefore, is not to be restricted except in the spirit of the appended claims.

We claim:

1. A computer implemented method for preventing transfer of control to illegal memory addresses during execution of a sequence of virtual machine instructions, operating in a computer system having memory, the method comprising the steps:

generating a sequence of machine executable instructions to carry out the operations defined by the sequence of virtual machine instructions;

providing, in a computer storage medium, status information, said status information indicating the illegal memory addresses which the sequence of virtual machine instructions is not allowed to transfer control to, and legal memory addresses which the sequence of virtual machine instructions is allowed to transfer control to;

analyzing the sequence of virtual machine instructions and generating a sequence of machine executable instructions to carry out operations defined by the sequence of virtual machine instructions; and encapsulating a machine executable instruction that can cause transfer of control to the illegal memory addresses with a predetermined sequence of machine executable checking instructions so that said predetermined sequence of machine executable checking instructions is executed in conjunction with said machine executable instruction that can cause transfer of control to said illegal memory addresses, the predetermined sequence of machine executable checking instructions signaling an error if said machine executable instruction that can cause transfer of control to the illegal memory addresses does attempt to transfer control to one of said illegal memory addresses.

2. The computer implemented method of claim 1 wherein said virtual machine instructions contain memory access instructions whose memory address operands can contain arbitrarily computed values, said arbitrarily computed values computed by said sequence of virtual machine instructions.

3. The computer implemented method of claim 2 wherein said memory address operands computed by the sequence of virtual machine instructions are the same addresses used by said sequence of machine executable instructions.

4. The computer implemented method of claim 2 wherein said virtual machine instructions can be executed with substantially similar behavior on computers with different central processing units.

5. The computer implemented method of claim 2 wherein said predetermined sequence of machine executable checking instructions prevents attempts to transfer control to said illegal memory addresses by transforming the illegal memory addresses based upon said status information.

6. The computer implemented method of claim 2 wherein said predetermined sequence of machine executable checking instructions prevents attempts to transfer control to said illegal memory addresses by transforming the illegal memory addresses into a value that will cause the computer system to signal an error.

7. A computer implemented method for preventing modification of illegal memory addresses during execution of a sequence of virtual machine instructions, operating in a computer system having memory, the method comprising the steps:

generating a sequence of machine executable instructions to carry out the operations defined by the sequence of virtual machine instructions;

providing, in a computer storage medium, status information, said status information indicating the illegal memory addresses which the sequence of virtual machine instructions is not allowed to modify and legal memory addresses which the sequence of virtual machine instructions is allowed to modify;

analyzing the sequence of virtual machine instructions and generating a sequence of machine executable instructions to carry out operations defined by the sequence of virtual machine instructions; and encapsulating a machine executable instruction that can cause modification of the illegal memory addresses with a predetermined sequence of machine executable checking instructions so that said predetermined sequence of machine executable checking instructions is executed in conjunction with said machine executable instruction that can cause modification of said illegal memory addresses, the predetermined sequence of machine executable checking instructions signaling an error if said machine executable instruction that can modify the illegal memory addresses does attempt to modify one of said illegal memory addresses.

8. The computer implemented method of claim 7 wherein said virtual machine instructions contain memory access instructions whose memory address operands can contain arbitrarily computed values, said arbitrarily computed values computed by said sequence of virtual machine instructions.

9. The computer implemented method of claim 8 wherein said memory address operands computed by the sequence of virtual machine instructions are the same addresses used by said sequence of machine executable instructions.

10. The computer implemented method of claim 8 wherein said virtual machine instructions can be executed with substantially similar behavior on computers with different central processing units.

11. The computer implemented method of claim 8 wherein said predetermined sequence of machine executable checking instructions prevents attempts to modify said illegal memory addresses by transforming the illegal memory addresses based upon said status information.

12. The computer implemented method of claim 8 wherein said predetermined sequence of machine executable checking instructions prevents attempts to modify said illegal memory addresses by transforming the illegal memory addresses into a value that will cause the computer system to signal an error.

* * * * *

UNITED STATES PATENT AND TRADEMARK OFFICE
CERTIFICATE OF CORRECTION

PATENT NO.   : 5,761,477

DATED        : June 2, 1998

INVENTOR(S)  : Robert S. Wahbe and Steven E. Lucco

It is certified that error appears in the above-identified patent and that said Letters Patent is hereby corrected as shown below:

On the title page, item [56] line 14 of Other Publications,
    Replace "aAcess" with -- Access --

Col. 6, line 34, replace "Fig. 4 is" with
    -- FIGs. 4A - E illustrate --

Col. 8, line 34, replace "is in Fig. 4" with
    -- as illustrated in FIGs. 4A - 4E --

Col. 10, line 38, delete "is"

Signed and Sealed this

Sixth Day of April, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,761,477
DATED : June 2, 1998
INVENTOR(S) : Wahbe et al.

It is certified that error appears in the above-indentified patent and that said Letters Patent is hereby corrected as shown below:

Column 15, line 23, "the" should be --said--.

Column 15, line 24, delete "the steps".

Column 15, line 30, "which the" should be --to which said--.

Column 15, line 31, "is" should be --are--.

Column 15, line 32, delete "to,".

Column 15, line 32, "which the" should be --to which said--.

Column 15, line 34, delete "to".

Column 15, line 63, "can be executed" should be --are executable--.

Column 16, line 14, delete "the steps".

Column 16, line 52, "can be executed" should be --are executable--.

Signed and Sealed this

Fifth Day of October, 1999

Q. TODD DICKINSON

Attest:

*Attesting Officer*             *Acting Commissioner of Patents and Trademarks*